United States Patent [19]
Smith et al.

[11] Patent Number: 5,883,495
[45] Date of Patent: Mar. 16, 1999

[54] BIDIRECTIONAL CURRENT CONTROL CIRCUIT SUITABLE FOR CONTROLLING THE CHARGING AND DISCHARGING OF RECHARGEABLE BATTERY CELLS

[75] Inventors: Gregory J. Smith; Stuart Shacter; Steve Martinez, all of Tucson, Ariz.

[73] Assignee: National Semiconductor Corporation, Santa Clara, Calif.

[21] Appl. No.: 904,138

[22] Filed: Jul. 31, 1997

[51] Int. Cl.⁶ ........................................... H02J 7/00
[52] U.S. Cl. .......................... 320/128; 320/134; 320/163
[58] Field of Search .................... 320/128, 134, 320/136, DIG. 13, 162, 163, 164, 165; 429/7, 90–93, 61

[56] References Cited

U.S. PATENT DOCUMENTS

| | | | |
|---|---|---|---|
| 5,493,197 | 2/1996 | Eguchi et al. | 320/134 |
| 5,526,215 | 6/1996 | Higashijima et al. | 361/86 |
| 5,530,336 | 6/1996 | Eguchi et al. | 320/5 |
| 5,534,765 | 7/1996 | Smith et al. | 324/771 |
| 5,547,775 | 8/1996 | Eguchi et al. | 320/118 |
| 5,703,463 | 12/1997 | Smith | 320/134 |
| 5,705,911 | 1/1998 | Tamai | 320/134 |
| 5,742,148 | 4/1998 | Sudo et al. | 320/128 |
| 5,783,322 | 7/1998 | Nagai et al. | 320/134 |

OTHER PUBLICATIONS

U.S. Patent Application No. 08/801,162, Filed: Feb. 18, 1997, entitled "Methods and Apparatus for Protecting Battery Cells From Overcharge", pp. 1–33.
Unitrode Integrated Circuits data sheet, "Programmable Electronic Circuit Breaker," May 1995 (4 pages).
Linear Technology data sheet, "LTC1255 Dual 24V High–Side MOSFET Driver," 1994, p. 4–215 (1 page).
Linear Technology data sheet, "LT1161 Quad Protected High–Side MOSFET Driver," 1994, p. 4–175 (1 page).
Linear Technology data sheet, "LTC1154 High–Side Micropower MOSFET Driver," 1994, p. 4–152 (1 page).
Linear Technology data sheet, "LTC1153 Auto–Reset Electronic Circuit Breaker," 1994, p. 4–138 (1 page).
Texas Instruments advertisement, "It's a Power Switch for Real–World Protection," 1995, (1 page).
Maxim Integrated Products advertisement, "First High–Side Current–Sensing IC," 1995, (1 page).
Unitrode Integrated Circuits data sheet, "Electronic Circuit Breaker for Negative Supplies," May 1995 (5 pages).
Seiko Semiconductor data sheet, "Battery Protection IC S–8491 Series," 1995, (28 pgs.).

*Primary Examiner*—Peter S. Wong
*Assistant Examiner*—K. Shin
*Attorney, Agent, or Firm*—Limbach & Limbach L.L.P.

[57] ABSTRACT

A bidirectional current control circuit suitable for use in controlling the charging and discharging of rechargeable battery cells includes two serially connected metal oxide semiconductor field effect transistors (MOSFETs) with respective body diodes, a resistor which is connected in series with the MOSFETs and develops a voltage based upon the current through such MOSFETs, and a control circuit. The control circuit monitors the voltage across the resistor and selectively switches the MOSFETs on or off individually. As long as the current through the MOSFETs is less than a maximum positive current and more than a minimum negative current, both MOSFETs are maintained in their respective on states. When the negative current becomes less than a minimum negative current, the first MOSFET is turned off while the second MOSFET is turned on, and when the positive current becomes greater than a maximum positive current, the second MOSFET is turned off while the first MOSFET is turned on. In both situations, when the current conducted by the MOSFET which is turned on and the body diode of the MOSFET which is turned off reverses direction and rises above a minimum current while remaining below the corresponding maximum current, a return to a safe operating condition is thereby indicated and both MOSFETs are turned on. In an alternative embodiment, the control circuit monitors the voltage across the MOSFETs themselves to determine whether and when to switch the individual MOSFETs on or off.

34 Claims, 2 Drawing Sheets

BIDIRECTIONAL CURRENT CONTROL CIRCUIT SUITABLE FOR CONTROLLING THE CHARGING AND DISCHARGING OF RECHARGEABLE BATTERY CELLS

BACKGROUND OF THE INVENTION

1. Field of the Invention

The present invention relates to current control circuits, and in particular, to bidirectional current control circuits suitable for use in controlling the charging and discharging of rechargeable battery cells.

2. Description of the Related Art

Circuits for controlling the bidirectional flow of current can be found in many applications. One increasingly common application is that of current control circuits for controlling the charging and discharging of rechargeable battery cells, including lithium and lithium-ion battery cells such as those used in portable computers.

As is well known, lithium and lithium-ion secondary (rechargeable) battery cells require protection from prolonged over-charging, over-discharging and over-current to prevent degradation of the performance of the cells, as well as to prevent the possibility of rupturing the case of the cells and potential combustion of the electrolyte within the cells. Power metal oxide semiconductor field effect transistor (MOSFET) switches in series with the current path for the cells are commonly used to disconnect the cells from chargers that fail to terminate the charging operation within specified voltage limits. Such MOSFET switches are typically driven from protection circuits internal to the battery pack which monitor the individual cell voltages for over-charge and over-discharge, as well as monitor the current for the battery pack for over-current in either direction.

In many applications, there are actually two power MOSFETs that are serially connected with the cells. Each MOSFET switch is turned on or off depending upon the type of failure. Normally, both MOSFETs are turned on and when a fault occurs, one of the MOSFETs is turned off by the protection circuit. The MOSFET that is turned off blocks current flow in the battery pack in the same direction that the current was flowing when the fault occurred.

Normally, recovery of such protection circuits requires some form of external circuitry for monitoring the operating environment of the battery pack (e.g., temperature, etc.) or the terminal voltages on the protection MOSFETs. It would be. desirable, however, to avoid the need for such external circuitry and provide for self-recovery of the protection circuit following a return to a safe operating condition.

SUMMARY OF THE INVENTION

A bidirectional current control circuit in accordance with the present invention provides for rapid recovery from fault conditions whereby a portion of the circuit had been disabled in response to an over-current condition. The presence of a safe current level flowing opposite to the direction of the current flow in which an over-current condition occurred is used to identify that a safe operating condition has been restored. Accordingly, external circuitry for monitoring the operating environment (such as temperature, etc.) or terminal voltages is not required.

In accordance with one embodiment of the present invention, a bidirectional current control circuit suitable for use in controlling the charging and discharging of rechargeable battery cells includes a current control circuit, a current detection circuit and a switch controller. The current control circuit includes: an on state which provides a bidirectional current conductivity; a first partially off state which provides a first unidirectional current conductivity in a first direction; and a second partially off state which provides a second unidirectional current conductivity in a second direction which is opposite to the first direction. The current detection circuit is coupled to the current control circuit and is configured to detect a magnitude and a direction of a current being conducted through the current control circuit. The switch controller is coupled to the current control circuit and the current detection circuit and is configured to: maintain the current control circuit in the on state when the current magnitude is less than first and second maximum currents; switch the current control circuit from the on state to the first partially off state when the current direction is in the second direction and the current magnitude is greater than the second maximum current; switch the current control circuit from the first partially off state to the on state when the current direction changes from the second direction to the first direction and the current magnitude is greater than a first minimum current; switch the current control circuit from the on state to the second partially off state when the current direction is in the first direction and the current magnitude is greater than the first maximum current; and switch the current control circuit from the second partially off state to the on state when the current direction changes from the first direction to the second direction and the current magnitude is greater than a second minimum current.

In accordance with another embodiment of the present invention, a bidirectional current control circuit suitable for use in controlling the charging and discharging of rechargeable battery cells includes first and second switch circuits, a current detection circuit and a switch controller. The first switch circuit includes a first on state which provides a first bidirectional current conductivity and includes a first off state which provides a first unidirectional current conductivity in a first direction. The second switch circuit is coupled in series with the first switch circuit, includes a second on state which provides a second bidirectional current conductivity and includes a second off state which provides a second unidirectional current conductivity in a second direction which is opposite to the first direction. The current detection circuit is coupled to the first and second switch circuits and is configured to detect a magnitude and a direction of a current being conducted through the first and second switch circuits. The switch controller is coupled to the first and second switch circuits and the current detection circuit and is configured to: maintain the first and second switch circuits in the first and second on states when the current magnitude is less than first and second maximum currents; switch the first switch circuit from the first on state to the first off state when the current direction is in the second direction and the current magnitude is greater than the second maximum current; switch the first switch circuit from the first off state to the first on state when the current direction changes from the second direction to the first direction and the current magnitude is greater than a first minimum current; switch the second switch circuit from the second on state to the second off state when the current direction is in the first direction and the current magnitude is greater than the first maximum current; and switch the second switch circuit from the second off state to the second on state when the current direction changes from the first direction to the second direction and the current magnitude is greater than a second minimum current.

In accordance with still another embodiment of the present invention, a bidirectional current control circuit suitable for use in controlling the charging and discharging of rechargeable battery cells includes first and second switch circuits, a current detection circuit and a switch controller. The first switch circuit is configured to receive a first control signal with enable and disable states and in accordance therewith provide a first bidirectional current conductivity and a first unidirectional current conductivity in a first direction, respectively. The second switch circuit is coupled in series with the first switch circuit and is configured to receive a second control signal with enable and disable states and in accordance therewith provide a second bidirectional current conductivity and a second unidirectional current conductivity in a second direction, respectively, such that the second direction is opposite to the first direction. The current detection circuit is coupled in series with the first and second switch circuits and is configured to detect a magnitude and a direction of a current being conducted through the first and second switch circuits and in accordance therewith provide a current detection signal which identifies the current magnitude and the current direction. The switch controller is coupled to the first and second switch circuits and the current detection circuit and is configured to receive the current detection signal and in accordance therewith provide the first and second control signals. The first and second control signals are maintained in the first and second control signal enable states when the current magnitude is less than first and second maximum currents. The first control signal: changes from the enable state to the disable state when the current direction is in the second direction and the current magnitude is greater than the second maximum current; and changes from the disable state to the enable state when the current direction changes from the second direction to the first direction and the current magnitude is greater than a first minimum current. The second control signal: changes from the enable state to the disable state when the current direction is in the first direction and the current magnitude is greater than the first maximum current; and changes from the disable state to the enable state when the current direction changes from the first direction to the second direction and the current magnitude is greater than a second minimum current.

In accordance with yet another embodiment of the present invention, a method of providing a bidirectional current control suitable for use in controlling the charging and discharging of rechargeable battery cells includes the steps of: detecting a magnitude and a direction of a current being conducted through a series circuit; maintaining the series circuit in an on state which provides a bidirectional current conductivity when the current magnitude is less than first and second maximum currents; switching the series circuit from the on state to a first partially off state which provides a first unidirectional current conductivity in a first direction when the current direction is in the second direction and the current magnitude is greater than the second maximum current; switching the series circuit from the first partially off state to the on state when the current direction changes from the second direction to the first direction and the current magnitude is greater than a first minimum current; switching the series circuit from the on state to a second partially off state which provides a second unidirectional current conductivity in a second direction which is opposite to the first direction when the current direction is in the first direction and the current magnitude is greater than the first maximum current; and switching the series circuit from the second partially off state to the on state when the current direction changes from the first direction to the second direction and the current magnitude is greater than a second minimum current.

In accordance with still yet another embodiment of the present invention, a bidirectional current control circuit suitable for use in controlling the charging and discharging of rechargeable battery cells includes a current control circuit and a switch controller. The current control circuit is configured to selectively conduct a current and in accordance therewith provide a plurality of signals which together identify a voltage across the current control circuit due to the conduction of the current. Such voltage has a first polarity when the conduction of the current is in a first direction, and a second polarity which is opposite to the first polarity when the conduction of the current is in a second direction which is opposite to the first direction. The current control circuit includes an on state which provides a bidirectional current conductivity, a first partially off state which provides a first unidirectional current conductivity in the first direction, and a second partially off state which provides a second unidirectional current conductivity in the second direction. The switch controller is coupled to the current control circuit and is configured to: maintain the current control circuit in the on state when the voltage is less than first and second maximum voltages; switch the current control circuit from the on state to the first partially off state when the voltage has the second polarity and is greater than the second maximum voltage; switch the current control circuit from the first partially off state to the on state when the voltage polarity changes from the second polarity to the first polarity and the voltage is greater than a first minimum voltage; switch the current control circuit from the on state to the second partially off state when the voltage has the first polarity and is greater than the first maximum voltage; and switch the current control circuit from the second partially off state to the on state when the voltage polarity changes from the first polarity to the second polarity and the voltage is greater than a second minimum voltage.

In accordance with another embodiment of the present invention, a bidirectional current control circuit suitable for use in controlling the charging and discharging of rechargeable battery cells includes two switch circuits, two terminals and a switch controller. The first switch circuit has a first on state which provides a first bidirectional current conductivity and has a first off state which provides a first unidirectional current conductivity in a first direction. The second switch circuit is coupled in series with the first switch circuit and has a second on state which provides a second bidirectional current conductivity and has a second off state which provides a second unidirectional current conductivity in a second direction which is opposite to the first direction. The two terminals are coupled at opposing ends of the series coupling of the two switch circuits and are configured to provide a set of signals which together identify a voltage across the series coupling of the two switch circuits due to a conduction of a current by such switch circuits. Such voltage has a first polarity when the conduction of the current is in the first direction, and a second polarity which is opposite to the first polarity when the conduction of the current is in the second direction. The switch controller is coupled to the switch circuits and the terminals and is configured to: maintain the first and second switch circuits in the first and second on states when the voltage is less than first and second maximum voltages; switch the first switch circuit from the first on state to the first off state when the voltage has the second polarity and is greater than the second maximum voltage; switch the first switch circuit from the first off state to the first on state when the voltage polarity changes from the second polarity to the first polarity and the voltage is greater than a first minimum voltage; switch the second switch circuit from the second on state to the second off state when the voltage has the first polarity and is greater than the first maximum voltage; and switch the second switch circuit from the second off state to the second on state when the voltage polarity changes from the first polarity to the second polarity and the voltage is greater than a second minimum voltage.

In accordance with still another embodiment of the present invention, a bidirectional current control circuit suitable for use in controlling the charging and discharging of rechargeable battery cells includes two switch circuits, two terminals and a switch controller. The first switch circuit is configured to receive a first control signal with enable and disable states and in accordance therewith provide a first bidirectional current conductivity and a first unidirectional current conductivity in a first direction, respectively. The second switch circuit is coupled in series with the first switch circuit and is configured to receive a second control signal with enable and disable states and in accordance therewith provide a second bidirectional current conductivity and a second unidirectional current conductivity in a second direction, respectively, wherein the second direction is opposite to the first direction. The two terminals are coupled at opposing ends of the series coupling of the two switch circuits and are configured to provide a set of signals which together identify a voltage across the series coupling of the two switch circuits due to a conduction of a current by such switch circuits. Such voltage has a first polarity when the conduction of the current is in the first direction, and a second polarity which is opposite to the first polarity when the conduction of the current is in the second direction. The switch controller is coupled to the two switch circuits and the two terminals and is configured to receive the set of signals and in accordance therewith provide the first and second control signals, such that: the first and second control signals are maintained in the first and second control signal enable states when the voltage is less than first and second maximum voltages; the first control signal changes from the enable state to the disable state when the voltage has the second polarity and is greater than the second maximum voltage; the first control signal changes from the disable state to the enable state when the voltage polarity changes from the second polarity to the first polarity and the voltage is greater than a first minimum voltage; the second control signal changes from the enable state to the disable state when the voltage has the first polarity and is greater than the first maximum voltage; and the second control signal changes from the disable state to the enable state when the voltage polarity changes from the first polarity to the second polarity and the voltage is greater than a second minimum voltage.

In accordance with yet another embodiment of the present invention, a method of providing a bidirectional current control suitable for use in controlling the charging and discharging of rechargeable battery cells includes the steps of: detecting a magnitude and a polarity of a voltage across a series circuit; maintaining the series circuit in an on state which provides a bidirectional current conductivity when the voltage magnitude is less than first and second maximum voltages; switching the series circuit from the on state to a first partially off state which provides a first unidirectional current conductivity in a first direction when the voltage has the second polarity and the voltage magnitude is greater than the second maximum voltage; switching the series circuit from the first partially off state to the on state when the voltage polarity changes from the second polarity to the first polarity and the voltage magnitude is greater than a first minimum voltage; switching the series circuit from the on state to a second partially off state which provides a second unidirectional current conductivity in a second direction which is opposite to the first direction when the voltage has the first polarity and the voltage magnitude is greater than the first maximum voltage; and switching the series circuit from the second partially off state to the on state when the voltage polarity changes from the first polarity to the second polarity and the voltage magnitude is greater than a second minimum voltage.

These and other features and advantages of the present invention will be understood upon consideration of the following detailed description of the invention and the accompanying drawings.

DETAILED DESCRIPTION OF THE INVENTION

Figure 1:
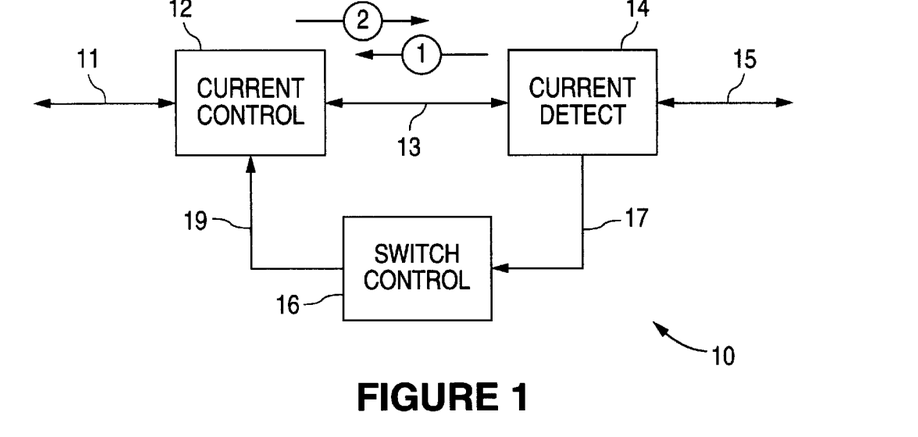
FIG. 1 is a functional block diagram of a bidirectional current control circuit in accordance with one embodiment of the present invention.

Referring to FIG. 1, a bidirectional current control circuit 10 in accordance with one embodiment of the present invention includes a current control circuit 12, a current detection circuit 14 and a switch controller 16, interconnected substantially as shown. Currents 11, 13, 15 flow in directions 1 and 2 into, out of and between the current control circuit 12 and current detection circuit 14, as well as between the current control circuit 12 and an external load (not shown) and/or power source (not shown). The current detection circuit 14 provides one or more current detection signals 17 to the switch controller 16 which, in turn, provides one or more control signals 19 to the current control circuit 12.

Figure 2:
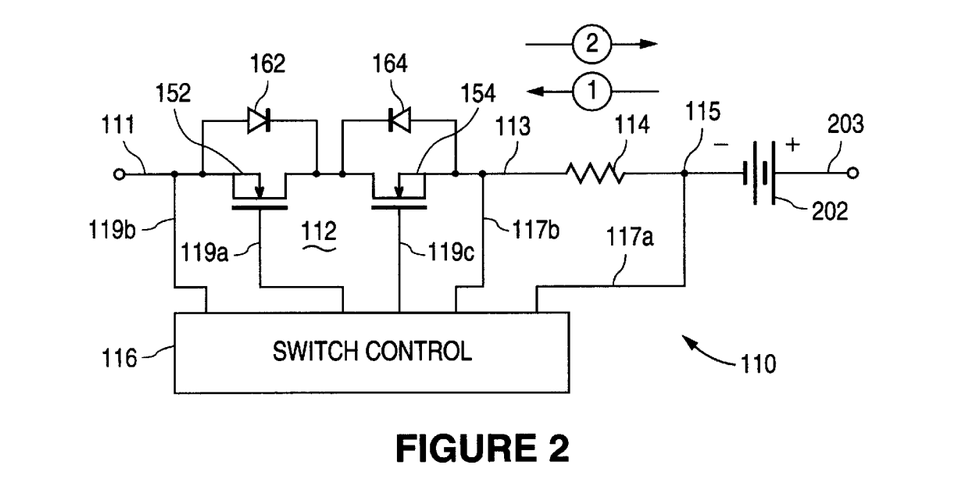
FIG. 2 is a schematic and functional block diagram of a bidirectional current control circuit suitable for use in controlling the charging and discharging of rechargeable battery cells in accordance with one embodiment of the present invention.

Referring to FIG. 2, one embodiment 110 of the current control circuit 10 of FIG. 1 is particularly suitable for use in controlling the charging and discharging of rechargeable battery cells 202. This control circuit 110 includes two drain-connected MOSFETs 152, 154 and a low value precision resistor 114, all connected in series with the battery cells 202. (Alternatively, the MOSFETs 152, 154 could be connected source-to-source.) Nodes 111 and 203 serve as the terminals for the battery pack containing the battery cells 202 and control circuit 110.

The current which is to be monitored during charging and discharging of the battery cells 202 flows in directions 1 and 2 through the MOSFETs 152, 154 and resistor 114 during charging and discharging, respectively. In both cases, a voltage is generated across the resistor 114 at nodes 113 and 115. This differential voltage provides two voltage signals 117a, 117b which together serve as a differential current detection signal for the switch controller 116. If these voltage signals 117a, 117b identify an over-current condition, i.e., the current-times-resistance voltage drop is higher than some predetermined threshold level caused by excessive charging or discharging current, the switch controller 116 turns off the appropriate MOSFET 152/154 with the control signal 119a/119c driving the gate terminal of such MOSFET 152/154.

For example, if an excessive current, as identified by the voltage signals 117a, 117b at the resistor 114, flows in direction 1 during charging the first MOSFET 152 is turned off by the switch controller 116 by making the voltage difference between voltage signals 119a and 119b equal to zero. Conversely, during an over-current condition when discharging the battery cells 202, the second MOSFET 154 is turned off by the switch controller 116 by making the voltage difference between voltages 119c and 117b equal to zero.

Even when otherwise turned off, however, each MOSFET 152, 154 nonetheless allows current to flow in the opposite direction through its respective body diode 162, 164, provided that the other MOSFET is still turned on. For example, if an over-current condition occurred during current flow in direction 1, thereby resulting in the first MOSFET 152 being turned off, a discharge current in direction 2 is still possible through the body diode 162 of such MOSFET 152 since the second MOSFET 154 is still turned on. This allows the battery cells 202 which should not accept any more charge to be prevented from accepting charge currents (direction 1) while nonetheless still allowing discharge currents (direction 2) to flow.

The presence of a discharge current (direction 2) following a fault condition and shutdown of the first MOSFET 152 during charge current flow (direction 1) indicates, due to the opposite current flow, that a safe operating condition has been restored. The resulting opposite voltage drop across the resistor 114 identifies this return to a safe operating condition to the switch controller 116 which, in turn, returns the previously turned off MOSFET 152 back to its conductive state by driving its gate control voltage signal 119a back to a sufficiently positive state (i.e., sufficiently beyond the threshold voltage $V_T$ of the MOSFET 152).

Hence, when each MOSFET 152, 154 is turned on, it is in an on state which provides bidirectional current conductivity. When each MOSFET 152, 154 is turned off, it is actually in a partially off state in the sense that a unidirectional current conductivity is provided due to the presence of a corresponding body diode 162, 164.

Figure 3:
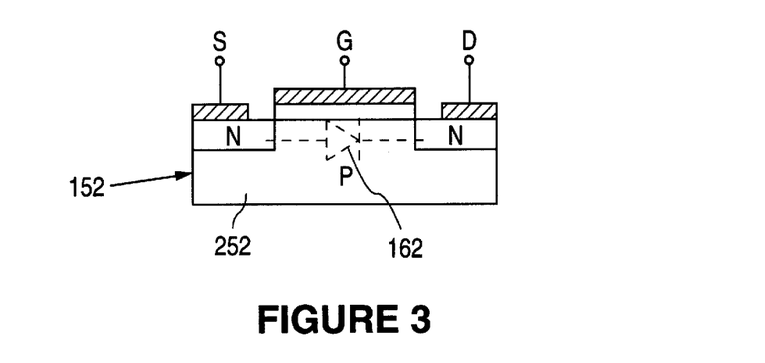
FIG. 3 is a cross-sectional representation of one of the protection MOSFET devices in the circuit of FIG. 2.

Referring to FIG. 3, the body diode 162 of the first MOSFET 152 is identified. Such a body diode is created when the body 252 and the source terminal are at substantially equal voltage potentials.

Figure 4:
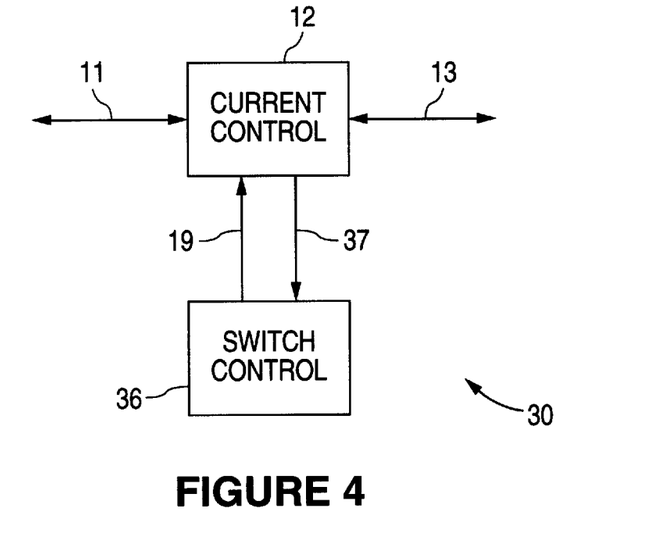
FIG. 4 is a finctional block diagram of a bidirectional current control circuit in accordance with another embodiment of the present invention.

Referring to FIG. 4, a bidirectional current control circuit 30 in accordance with another embodiment of the present invention includes a current control circuit 12 and a switch controller 36, interconnected substantially as shown. As in the circuit 10 of FIG. 1, currents 11, 13 flow in directions 1 and 2 into and out of the current control circuit 12, as well as between the current control circuit 12 and an external load (not shown) and/or power source (not shown). The current control circuit 12 provides detection signals 37 to the switch controller 36 which, in turn, provides one or more control signals 19 to the current control circuit 12.

Figure 5:
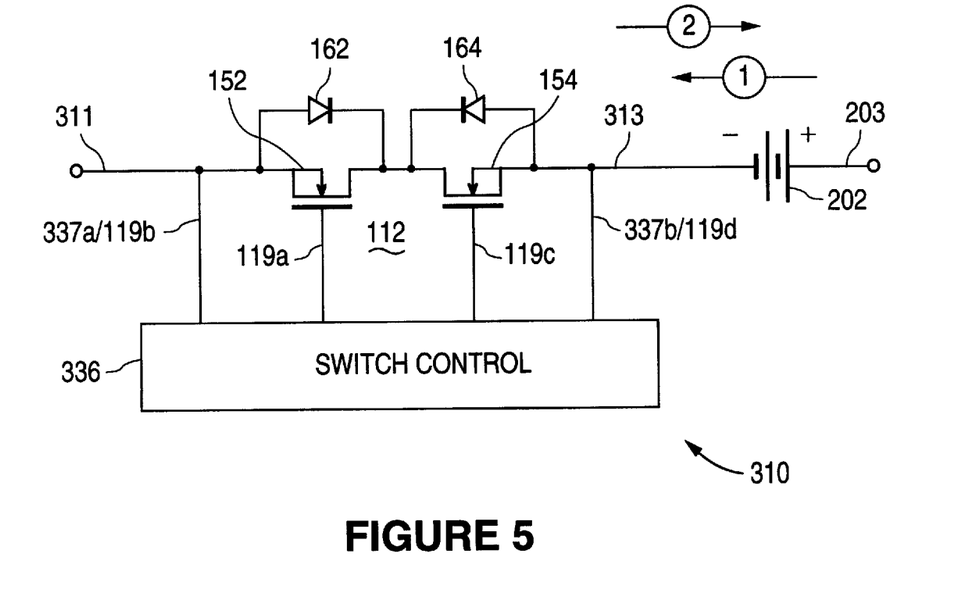
FIG. 5 is a schematic and functional block diagram of a bidirectional current control circuit suitable for use in controlling the charging and discharging of rechargeable battery cells in accordance with another embodiment of the present invention.

Referring to FIG. 5, one embodiment 310 of the current control circuit 30 of FIG. 4 is particularly suitable for use in controlling the charging and discharging of rechargeable battery cells 202. This control circuit 310 includes two drain-connected MOSFETs 152, 154 connected in series with the battery cells 202. (Alternatively, the MOSFETs 152, 154 could be connected source-to-source.) Nodes 311 and 203 serve as the terminals for the battery pack containing the battery cells 202 and control circuit 310.

The current which is to be monitored during charging and discharging of the battery cells 202 flows in directions 1 and 2 through the MOSFETs 152, 154 during charging and discharging, respectively. In both cases, a voltage is generated across the MOSFETs 152, 154 at nodes 311 and 313. This differential voltage provides two voltage signals 337a, 337b which together serve as a differential detection signal for the switch controller 336. If these voltage signals 337a, 337b identify an over-current condition, i.e., the voltage drop across the MOSFETs 152, 154 (the current multiplied by the sum of the drain-to-source resistances of the MOSFETs 152, 154) is higher than some predetermined threshold level caused by excessive charging or discharging current, the switch controller 336 turns off the appropriate MOSFET 152/154 with the control signal 119a/119c driving the gate terminal of such MOSFET 152/154.

For example, if an excessive current, as identified by the voltage 337a/337b across the MOSFETs 152, 154, flows in direction 1 during charging the first MOSFET 152 is turned off by the switch controller 336 by making the voltage difference between gate voltage 119a and source voltage 119b equal to zero. Conversely, during an over-current condition when discharging the battery cells 202, the second MOSFET 154 is turned off by the switch controller 336 by making the voltage difference between gate voltage 119c and source voltage 119d equal to zero. (The use of the signal lines connected between the switch controller 336 and nodes 311 and 313 are multiplexed in the sense that during its input, or voltage sensing, mode the switch controller 336 uses them to monitor the voltages 337a, 337b at the source terminals of the MOSFETs 152, 154, and during its output mode the switch controller 336 uses them to convey the control voltages 119a, 119b, 119c, 119d for the MOSFETs 152, 154.)

As discussed above, even when otherwise turned off, each MOSFET 152, 154 allows current to, flow in the opposite direction through its respective body diode 162, 164, provided that the other MOSFET is still turned on. For example, if an over-current condition occurred during current flow in direction 1, thereby resulting in the first MOSFET 152 being turned off, a discharge current in direction 2 is still possible through the body diode 162 of such MOSFET 152 since the second MOSFET 154 is still turned on. This allows the battery cells 202 which should not accept any more charge to be prevented from accepting charge currents (direction 1) while nonetheless still allowing discharge currents (direction 2) to flow.

The presence of a discharge current (direction 2) following a fault condition and shutdown of the first MOSFET 152 during charge current flow (direction 1) indicates, due to the opposite current flow, that a safe operating condition has been restored. The resulting opposite voltage drop across the associated body diode 162 identifies this return to a safe operating condition to the switch controller 336 which, in turn, returns the previously turned off MOSFET 152 back to its conductive state by driving its gate control voltage signal 119a back to a sufficiently positive state (i.e., sufficiently beyond the threshold voltage $V_T$ of the MOSFET 152). This return to a safe operating condition is recognized by the switch controller 336 because the voltage drop across the conductive body diode 162 is several tenths of a volt, as opposed to the voltage drop of several thousandths of a volt normally seen across a fully conductive (i.e., turned on) MOSFET with its correspondingly low drain-to-source resistance, and because the polarity of such voltage is now reversed from the original voltage which was present when the original over-current condition occurred.

The switch controllers 116, 336 can be implemented in accordance with any one of many techniques well known in the art for monitoring differential voltages and generating corresponding output voltages. Examples of circuits appropriate for use as the switch controller 336 can be found in U.S. Pat. No. 5,534,788, and in commonly assigned, co-pending U.S. pat. appplication Ser. No. 08/801,162, the disclosures of which are both incorporated herein by reference.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a bidirectional current control circuit suitable for use in controlling the charging and discharging of rechargeable battery cells, comprising:
   a current control circuit with
      an on state which provides a bidirectional current conductivity,
      a first partially off state which provides a first unidirectional current conductivity in a first direction, and
      a second partially off state which provides a second unidirectional current conductivity in a second direction which is opposite to said first direction;
   a current detection circuit, coupled to said current control circuit, configured to detect a magnitude and a direction of a current being conducted through said current control circuit; and
   a switch controller, coupled to said current control circuit and said current detection circuit, configured to
      maintain said current control circuit in said on state when said current magnitude is less than first and second maximum currents,
      switch said current control circuit from said on state to said first partially off state when said current direction is in said second direction and said current magnitude is greater than said second maximum current,
      switch said current control circuit from said first partially off state to said on state when said current direction changes from said second direction to said first direction and said current magnitude is greater than a first minimum current,
      switch said current control circuit from said on state to said second partially off state when said current direction is in said first direction and said current magnitude is greater than said first maximum current, and
      switch said current control circuit from said second partially off state to said on state when said current direction changes from said first direction to said second direction and said current magnitude is greater than a second minimum current.

2. The apparatus of claim 1, wherein said current control circuit comprises first and second metal oxide semiconductor field effect transistors coupled together in series.

3. The apparatus of claim 2, wherein said current control circuit further comprises first and second diodes.

4. The apparatus of claim 1, wherein:
   said bidirectional current control circuit is in an integrated form; and
   said current control circuit comprises first and second integrated metal oxide semiconductor field effect transistors with first and second body diodes, respectively.

5. The apparatus of claim 1, wherein said current detection circuit comprises a resistor connected in series with said current control circuit.

6. An apparatus including a bidirectional current control circuit suitable for use in controlling the charging and discharging of rechargeable battery cells, comprising:
   a first switch circuit with a first on state which provides a first bidirectional current conductivity and with a first off state which provides a first unidirectional current conductivity in a first direction;
   a second switch circuit, coupled in series with said first switch circuit, with a second on state which provides a second bidirectional current conductivity and with a second off state which provides a second unidirectional current conductivity in a second direction which is opposite to said first direction;
   a current detection circuit, coupled to said first and second switch circuits, configured to detect a magnitude and a direction of a current being conducted through said first and second switch circuits; and
   a switch controller, coupled to said first and second switch circuits and said current detection circuit, configured to
      maintain said first and second switch circuits in said first and second on states when said current magnitude is less than first and second maximum currents,
      switch said first switch circuit from said first on state to said first off state when said current direction is in said second direction and said current magnitude is greater than said second maximum current,
      switch said first switch circuit from said first off state to said first on state when said current direction changes from said second direction to said first direction and said current magnitude is greater than a first minimum current,
      switch said second switch circuit from said second on state to said second off state when said current direction is in said first direction and said current magnitude is greater than said first maximum current, and
      switch said second switch circuit from said second off state to said second on state when said current direction changes from said first direction to said second direction and said current magnitude is greater than a second minimum current.

7. The apparatus of claim 6, wherein said first switch circuit comprises a metal oxide semiconductor field effect transistor.

8. The apparatus of claim 7, wherein said metal oxide semiconductor field effect transistor includes a body diode.

9. The apparatus of claim 6, wherein:
   said bidirectional current control circuit is in an integrated form;
   said first and second switch circuits comprise first and second metal oxide semiconductor field effect transistors with first and second body diodes, respectively.

10. The apparatus of claim 6, wherein said current detection circuit comprises a resistor connected in series with said first and second switch circuits.

11. An apparatus including a bidirectional current control circuit suitable for use in controlling the charging and discharging of rechargeable battery cells, comprising:

a first switch circuit configured to receive a first control signal with enable and disable states and in accordance therewith provide a first bidirectional current conductivity and a first unidirectional current conductivity in a first direction, respectively;

a second switch circuit, coupled in series with said first switch circuit, configured to receive a second control signal with enable and disable states and in accordance therewith provide a second bidirectional current conductivity and a second unidirectional current conductivity in a second direction, respectively, wherein said second direction is opposite to said first direction;

a current detection circuit, coupled in series with said first and second switch circuits, configured to detect a magnitude and a direction of a current being conducted through said first and second switch circuits and in accordance therewith provide a current detection signal which identifies said current magnitude and said current direction; and a switch controller, coupled to said first and second switch circuits and said current detection circuit, configured to receive said current detection signal and in accordance therewith provide said first and second control signals, wherein said first and second control signals are maintained in said first and second control signal enable states when said current magnitude is less than first and second maximum currents, said first control signal
changes from said enable state to said disable state when said current direction is in said second direction and said current magnitude is greater than said second maximum current, and
changes from said disable state to said enable state when said current direction changes from said second direction to said first direction and said current magnitude is greater than a first minimum current, and said second control signal
changes from said enable state to said disable state when said current direction is in said first direction and said current magnitude is greater than said first maximum current, and
changes from said disable state to said enable state when said current direction changes from said first direction to said second direction and said current magnitude is greater than a second minimum current.

12. The apparatus of claim 11, wherein said first switch circuit comprises a metal oxide semiconductor field effect transistor.

13. The apparatus of claim 12, wherein said metal oxide semiconductor field effect transistor includes a body diode.

14. The apparatus of claim 11, wherein:
said bidirectional current control circuit is in an integrated form;
said first and second switch circuits comprise first and second metal oxide semiconductor field effect transistors with first and second body diodes, respectively.

15. The apparatus of claim 11, wherein said current detection circuit comprises a resistor connected in series with said first and second switch circuits.

16. A method of providing a bidirectional current control suitable for use in controlling the charging and discharging of rechargeable battery cells, comprising the steps of:

detecting a magnitude and a direction of a current being conducted through a series circuit;

maintaining said series circuit in an on state which provides a bidirectional current conductivity when said current magnitude is less than first and second maximum currents;

switching said series circuit from said on state to a first partially off state which provides a first unidirectional current conductivity in a first direction when said current direction is in said second direction and said current magnitude is greater than said second maximum current;

switching said series circuit from said first partially off state to said on state when said current direction changes from said second direction to said first direction and said current magnitude is greater than a first minimum current;

switching said series circuit from said on state to a second partially off state which provides a second unidirectional current conductivity in a second direction which is opposite to said first direction when said current direction is in said first direction and said current magnitude is greater than said first maximum current; and switching said series circuit from said second partially off state to said on state when said current direction changes from said first direction to said second direction and said current magnitude is greater than a second minimum current.

17. The method of claim 16, wherein:
said step of maintaining said series circuit in an on state comprises maintaining first and second metal oxide semiconductor field effect transistors coupled together in series in first and second on states, respectively; and
said steps of switching said series circuit between said on state and said first and second partially off states comprise individually switching said first and second metal oxide semiconductor field effect transistors between said on state and said first and second partially off states, respectively.

18. The method of claim 16, wherein:
said step of maintaining said series circuit in an on state comprises maintaining first and second metal oxide semiconductor field effect transistors with first and second body diodes, respectively, coupled together in series in first and second on states, respectively; and
said steps of switching said series circuit between said on state and said first and second partially off states comprise individually switching said first and second metal oxide semiconductor field effect transistors between said on state and said first and second partially off states, respectively.

19. The method of claim 16, wherein said step of detecting a magnitude and a direction of a current being conducted through a series circuit comprises detecting a magnitude and a direction of a current being conducted through a resistor.

20. An apparatus including a bidirectional current control circuit suitable for use in controlling the charging and discharging of rechargeable battery cells, comprising:

a current control circuit configured to selectively conduct a current and in accordance therewith provide a plurality of signals which together identify a voltage across said current control circuit due to said conduction of said current, wherein said voltage has
a first polarity when said conduction of said current is in a first direction, and
a second polarity which is opposite to said first polarity when said conduction of said current is in a second direction which is opposite to said first direction, and wherein said current control circuit includes
an on state which provides a bidirectional current conductivity,
a first partially off state which provides a first unidirectional current conductivity in said first direction, and
a second partially off state which provides a second unidirectional current conductivity in said second direction; and a switch controller, coupled to said current control circuit, configured to
maintain said current control circuit in said on state when said voltage is less than first and second maximum voltages,
switch said current control circuit from said on state to said first partially off state when said voltage has said second polarity and is greater than said second maximum voltage,
switch said current control circuit from said first partially off state to said on state when said voltage polarity changes from said second polarity to said first polarity and said voltage is greater than a first minimum voltage,
switch said current control circuit from said on state to said second partially off state when said voltage has said first polarity and is greater than said first maximum voltage, and
switch said current control circuit from said second partially off state to said on state when said voltage polarity changes from said first polarity to said second polarity and said voltage is greater than a second minimum voltage.

21. The apparatus of claim 20, wherein said current control circuit comprises first and second metal oxide semiconductor field effect transistors coupled together in series.

22. The apparatus of claim 21, wherein said current control circuit further comprises first and second diodes.

23. The apparatus of claim 20, wherein:
said bidirectional current control circuit is in an integrated form; and
said current control circuit comprises first and second integrated metal oxide semiconductor field effect transistors with first and second body diodes, respectively.

24. An apparatus including a bidirectional current control circuit suitable for use in controlling the charging and discharging of rechargeable battery cells, comprising:
a first switch circuit with a first on state which provides a first bidirectional current conductivity and with a first off state which provides a first unidirectional current conductivity in a first direction;
a second switch circuit, coupled in series with said first switch circuit, with a second on state which provides a second bidirectional current conductivity and with a second off state which provides a second unidirectional current conductivity in a second direction which is opposite to said first direction;
first and second terminals, coupled at opposing ends of said series coupling of said first and second switch circuits, configured to provide a plurality of signals which together identify a voltage across said series coupling of said first and second switch circuits due to a conduction of a current by said first and second switch circuits, wherein said voltage has
a first polarity when said conduction of said current is in said first direction, and
a second polarity which is opposite to said first polarity when said conduction of said current is in said second direction; and
a switch controller, coupled to said first and second switch circuits and said first and second terminals, configured to
maintain said first and second switch circuits in said first and second on states when said voltage is less than first and second maximum voltages,
switch said first switch circuit from said first on state to said first off state when said voltage has said second polarity and is greater than said second maximum voltage,
switch said first switch circuit from said first off state to said first on state when said voltage polarity changes from said second polarity to said first polarity and said voltage is greater than a first minimum voltage,
switch said second switch circuit from said second on state to said second off state when said voltage has said first polarity and is greater than said first maximum voltage, and
switch said second switch circuit from said second off state to said second on state when said voltage polarity changes from said first polarity to said second polarity and said voltage is greater than a second minimum voltage.

25. The apparatus of claim 24, wherein said first switch circuit comprises a metal oxide semiconductor field effect transistor.

26. The apparatus of claim 25, wherein said metal oxide semiconductor field effect transistor includes a body diode.

27. The apparatus of claim 24, wherein:
said bidirectional current control circuit is in an integrated form;
said first and second switch circuits comprise first and second metal oxide semiconductor field effect transistors with first and second body diodes, respectively.

28. An apparatus including a bidirectional current control circuit suitable for use in controlling the charging and discharging of rechargeable battery cells, comprising:
a first switch circuit configured to receive a first control signal with enable and disable states and in accordance therewith provide a first bidirectional current conductivity and a first unidirectional current conductivity in a first direction, respectively;
a second switch circuit, coupled in series with said first switch circuit, configured to receive a second control signal with enable and disable states and in accordance therewith provide a second bidirectional current conductivity and a second unidirectional current conductivity in a second direction, respectively, wherein said second direction is opposite to said first direction;
first and second terminals, coupled at opposing ends of said series coupling of said first and second switch circuits, configured to provide a plurality of signals which together identify a voltage across said series coupling of said first and second switch circuits due to a conduction of a current by said first and second switch circuits, wherein said voltage has
a first polarity when said conduction of said current is in said first direction, and a second polarity which is opposite to said first polarity when said conduction of said current is in said second direction; and a switch controller, coupled to said first and second switch circuits and said first and second terminals, configured to receive said plurality of signals and in accordance therewith provide said first and second control signals, wherein said first and second control signals are maintained in said first and second control signal enable states when said voltage is less than first and second maximum voltages, said first control signal changes from said enable state to said disable state when said voltage has said second polarity and is greater than said second maximum voltage, and changes from said disable state to said enable state when said voltage polarity changes from said second polarity to said first polarity and said voltage is greater than a first minimum voltage, and said second control signal changes from said enable state to said disable state when said voltage has said first polarity and is greater than said first maximum voltage, and changes from said disable state to said enable state when said voltage polarity changes from said first polarity to said second polarity and said voltage is greater than a second minimum voltage.

29. The apparatus of claim 28, wherein said first switch circuit comprises a metal oxide semiconductor field effect transistor.

30. The apparatus of claim 29, wherein said metal oxide semiconductor field effect transistor includes a body diode.

31. The apparatus of claim 28, wherein:

said bidirectional current control circuit is in an integrated form;

said first and second switch circuits comprise first and second metal oxide semiconductor field effect transistors with first and second body diodes, respectively.

32. A method of providing a bidirectional current control suitable for use in controlling the charging and discharging of rechargeable battery cells, comprising the steps of:

detecting a magnitude and a polarity of a voltage across a series circuit;

maintaining said series circuit in an on state which provides a bidirectional current conductivity when said voltage magnitude is less than first and second maximum voltages;

switching said series circuit from said on state to a first partially off state which provides a first unidirectional current conductivity in a first direction when said voltage has said second polarity and said voltage magnitude is greater than said second maximum voltage;

switching said series circuit from said first partially off state to said on state when said voltage polarity changes from said second polarity to said first polarity and said voltage magnitude is greater than a first minimum voltage;

switching said series circuit from said on state to a second partially off state which provides a second unidirectional current conductivity in a second direction which is opposite to said first direction when said voltage has said first polarity and said voltage magnitude is greater than said first maximum voltage; and switching said series circuit from said second partially off state to said on state when said voltage polarity changes from said first polarity to said second polarity and said voltage magnitude is greater than a second minimum voltage.

33. The method of claim 32, wherein:

said step of maintaining said series circuit in an on state comprises maintaining first and second metal oxide semiconductor field effect transistors coupled together in series in first and second on states, respectively; and said steps of switching said series circuit between said on state and said first and second partially off states comprise individually switching said first and second metal oxide semiconductor field effect transistors between said on state and said first and second partially off states, respectively.

34. The method of claim 32, wherein:

said step of maintaining said series circuit in an on state comprises maintaining first and second metal oxide semiconductor field effect transistors with first and second body diodes, respectively, coupled together in series in first and second on states, respectively; and said steps of switching said series circuit between said on state and said first and second partially off states comprise individually switching said first and second metal oxide semiconductor field effect transistors between said on state and said first and second partially off states, respectively.

* * * * *